United States Patent [19]

Morrow, Sr. et al.

[11] 4,000,784
[45] Jan. 4, 1977

[54] DEMOUNTABLE SELF-PROPELLED CRANE TRANSPORT ASSEMBLY

[75] Inventors: James G. Morrow, Sr.; David J. Pech; Norman J. Kutz, all of Manitowoc, Wis.

[73] Assignee: The Manitowoc Company, Inc., Manitowoc, Wis.

[22] Filed: Apr. 24, 1975

[21] Appl. No.: 571,303

[52] U.S. Cl. .................................. 180/9.48; 305/6
[51] Int. Cl.² ............................................ B62D 55/00
[58] Field of Search ......... 305/6; 280/34 R, 150.5; 214/131 A, 145 A; 180/9.1, 9.2 C, 9.42, 9.26, 9.28, 9.48, 9.3; 212/1, 60–69

[56] References Cited
UNITED STATES PATENTS

| | | | |
|---|---|---|---|
| 2,681,231 | 6/1954 | Kondracki | 180/9.48 |
| 3,204,793 | 9/1965 | Lane | 214/145 A |
| 3,385,014 | 5/1968 | Haug | 180/9.48 |
| 3,820,616 | 6/1974 | Juergens | 180/9.48 |

*Primary Examiner*—Robert J. Spar
*Assistant Examiner*—Lawrence J. Oresky
*Attorney, Agent, or Firm*—Leydig, Voit, Osann, Mayer & Holt, Ltd.

[57] ABSTRACT

A load handling crane is disclosed having a demountable self-propelled transport assembly including a central car body portion and detachable transverse beams, side beams, crawler assemblies and power source. Hydraulic jacks and push cylinders are mounted on the beams to facilitate detaching the components of the assembly. The power source includes an internal combustion engine and a pair of hydraulic pumps.

7 Claims, 9 Drawing Figures

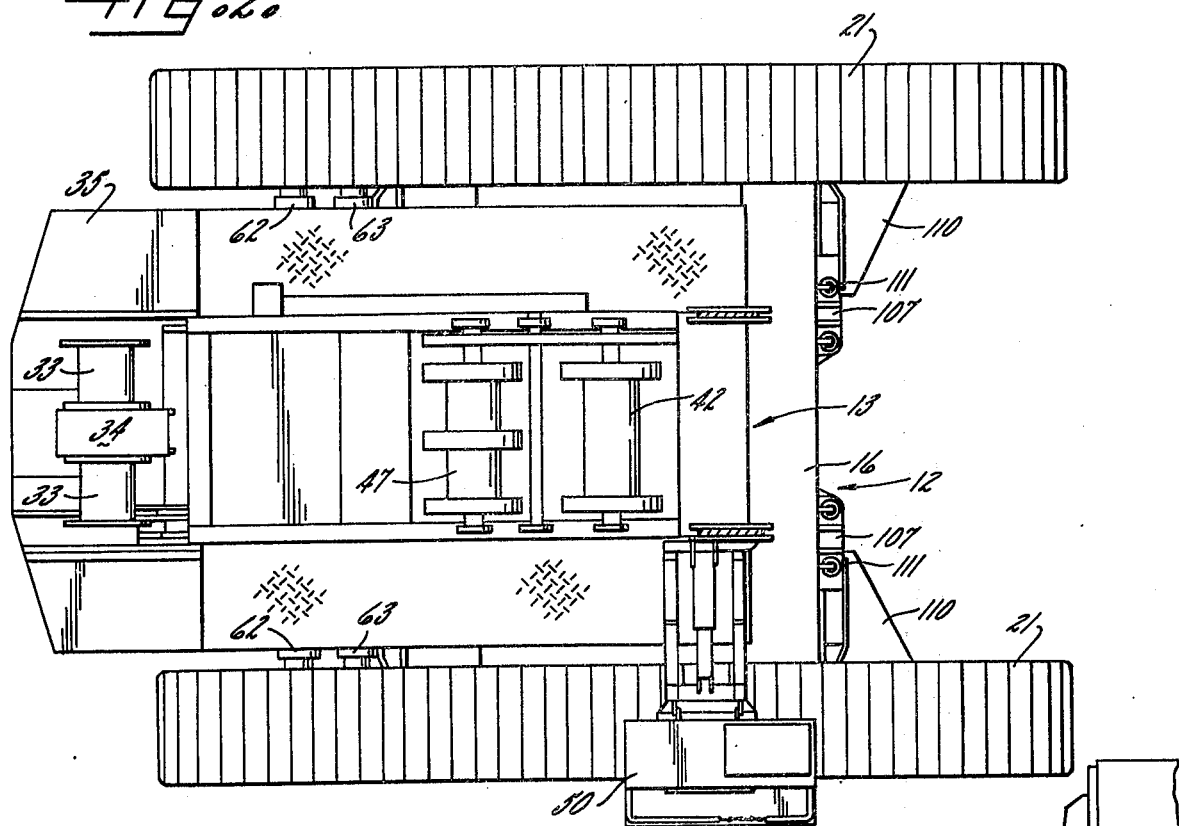
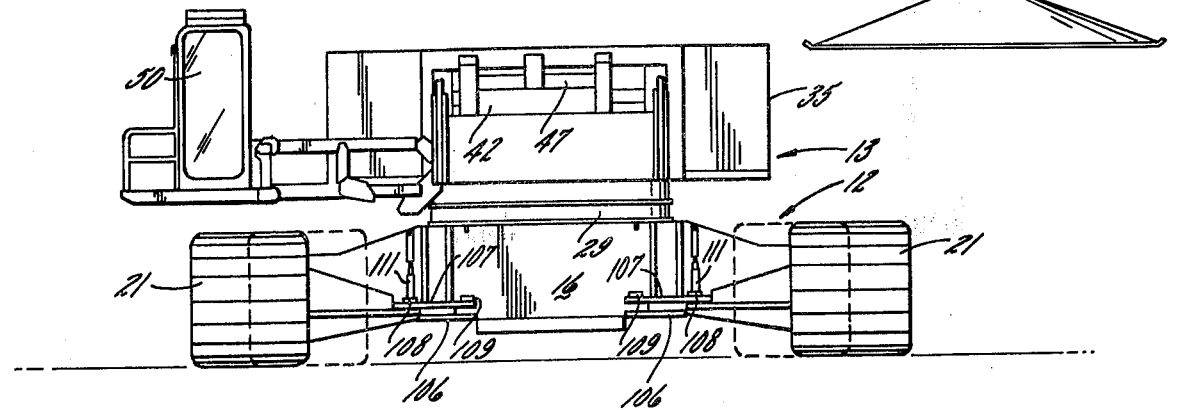

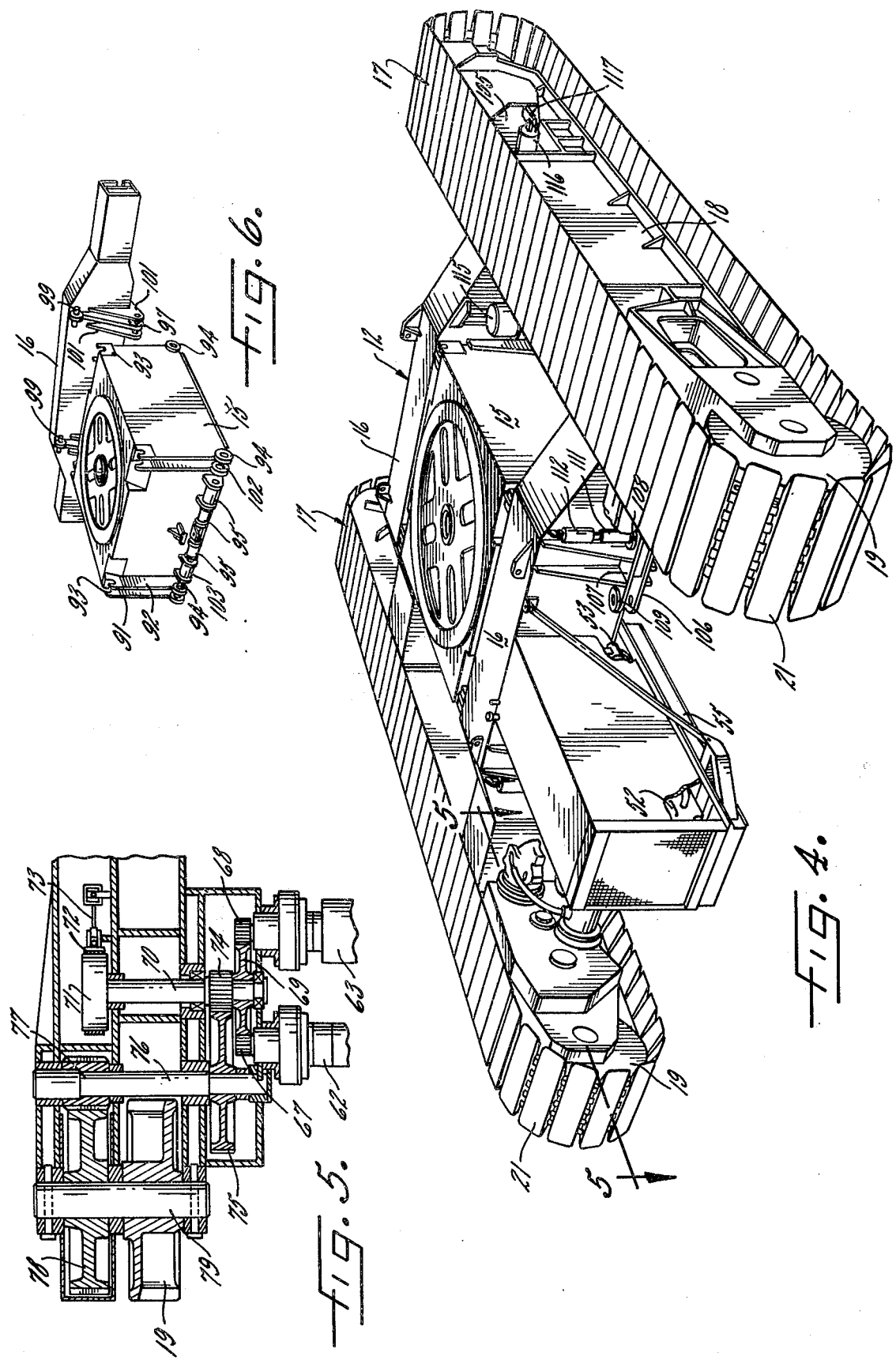

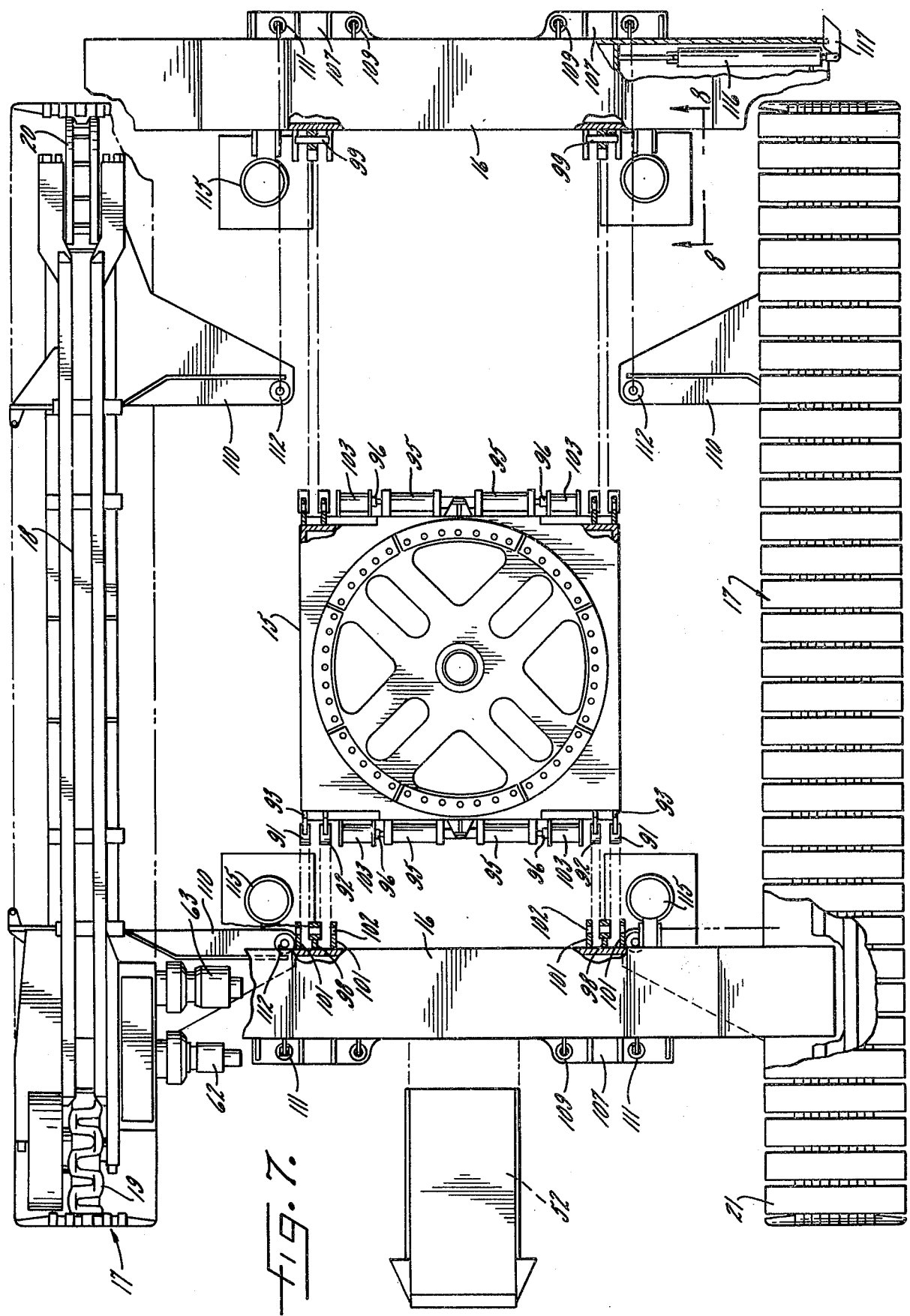

DEMOUNTABLE SELF-PROPELLED CRANE TRANSPORT ASSEMBLY

BACKGROUND OF THE INVENTION

This invention relates generally to load handling devices and more particularly concerns a demountable self-propelled transport assembly for such devices.

One of the difficulties with very large load handling devices, such as mobile cranes, is that due to their size they must be disassembled for shipment and transport from job site to another.

Accordingly it is an object of the present invention to provide a mobile crane with a demountable transport assembly which may be conveniently broken down into components and arranged for shipment on a carrier just wide enough to accommodate the central body portion of the transport assembly.

A more detailed object is to provide the transport assembly with hydraulic jacks and push cylinders which may be selectively energized to facilitate detaching the components of the assembly.

It is another object to make the transport assembly self-propelled so that it may be used separately as a heavy duty transport vehicle when the rotatable upper structure is removed.

It is a more specific object to provide an improved self-propelled drive assembly for a large crane wherein the driving speed and torque imparted to each crawler assembly may be selectively regulated to meet varying working conditions.

Other objects and advantages of the invention will become apparent upon reading the following detailed description and upon reference to the drawings, in which:

FIG. 1 is a fragmentary side elevation, somewhat schematic, of a crane embodying the invention;

FIG. 3 is a fragmentary front elevation;

FIG. 4 is a perspective view of the crane lower works with the ring gear and pivot post removed;

FIG. 5 is an enlarged fragmentary section taken along line 5—5 in FIG. 4;

FIG. 6 is a fragmentary, exploded perspective of the central body portion and one of the disconnected transverse beams;

FIG. 7 is a fragmentary, exploded plan view of the crane lower works shown in FIG. 4;

FIG. 8 is an enlarged fragmentary section taken along line 8—8 in FIG. 7; and,

Figure 2:
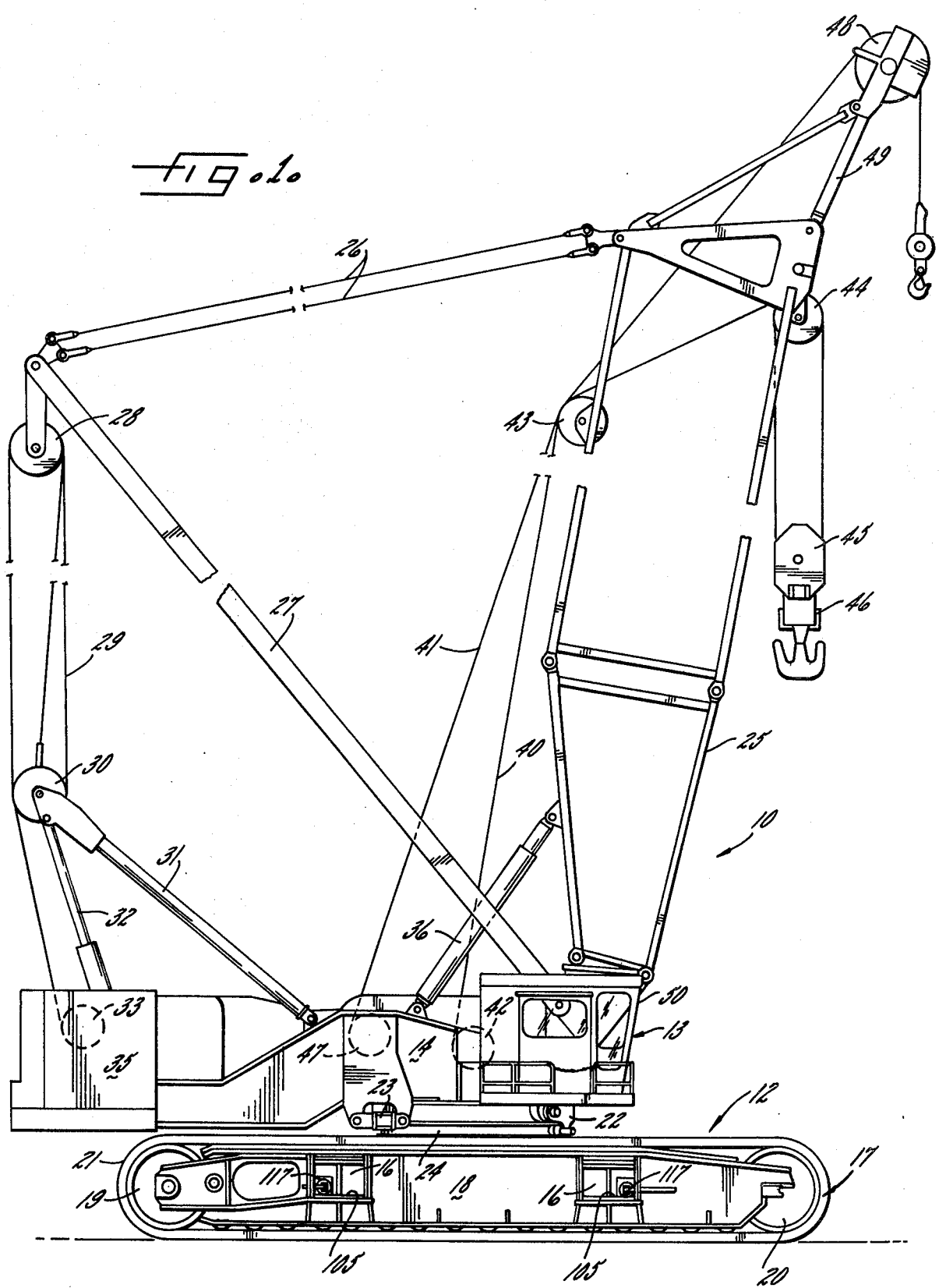
FIG. 2 is a plan view of the crane upper works with boom, masts, gantry and rigging removed.

While the invention will be described in connection with a preferred embodiment, it will be understood that we do not intend to limit the invention to that embodiment. On the contrary, we intend to cover all alternatives, modifications and equivalents as may be included within the spirit and scope of the invention as defined by the appended claims.

Turning now to the drawings, there is shown in FIG. 1 a load handling device in the form of a crane assembly 10 with which the present invention is associated. The crane assembly 10 includes lower works 12 and upper works 13. As shown more clearly in FIGS. 4 and 7, the lower works 12 includes a central car body 15 mounted between a pair of transverse beams 16, the ends of which are supported by a pair of traction assemblies 17. Each traction assembly includes side frames 18 which support a drive sprocket 19 and an idler sprocket 20 around which a crawler tread 21 runs.

The upper works 13 of the crane assembly 10 includes a rotatable bed 14 supported by front and rear roller assemblies 22 and 23 which engage a ring gear and roller path 24 on the lower works 12. The upper works 13 carries a pivotally mounted boom 25 supported by two pairs of laterally spaced pendants 26 (only one pair of which is shown) extending rearwardly to the upper ends of laterally spaced masts 27 each of which carries an equalizer assembly 28 around which a boom hoist line 29 runs. Another equalizer assembly 30 is carried by the upper end of a pair of pivotally mounted gantry members 31 which are raised and held in position by a back hitch assembly in the form of a pair of hydraulic cylinders 32 (only one being shown). It will be seen that each of the boom hoist lines 29 forms a three-part line between the equalizer assemblies 28, 30 and the other end of each lline is wound on one drum 33 of a dual drum boom hoist 34 at the rear end of the upper works 13.

To prevent overcentering of the boom 25 when it is raised, the upper works 13 carries automatic, cushioned boom stops 36. Both the boom 25 and the boom stops 36 may be removed from the upper works 13 when it is desired to move the crane 10 to another job site. In the illustrated embodiment the crane 10 is equipped with two lift lines 40 and 41. The front lift line 40 is wound on a drum 42 and extends over a sheave 43 on the rear side of the boom 25 and then makes a double reach between upper and lower equalizer assemblies 44, 45, respectively, carried by the boom and a main hook assembly 46. The rear lift line 41 is wound on another drum 47 and extends over another sheave 43 and then over an upper pulley assembly 48 mounted on the end of a boom extension 49. It will be also understood that the upper works carries a suitable power source, such as a diesel engine (not shown) and appropriate variable control power transmission means for the major functions of the machine. The crane 10 is also provided with an operator's cab 50 within which the controls for the crane functions are located.

Pursuant to the present invention, the lower works 12 is assembled in the form of a demountable self-propelled transport assembly which may be used as an independent load bearing vehicle when the upper works 13 and roller path 24 are removed, as shown in FIG. 4. For driving the lower works 12, an engine 52 powers a pair of variable displacement, hydraulic pumps 53 through an enclosed gear train and transmission case 54 mounted on an engine bed 55 detachably secured to one of the cross beams 16.

Figure 9:
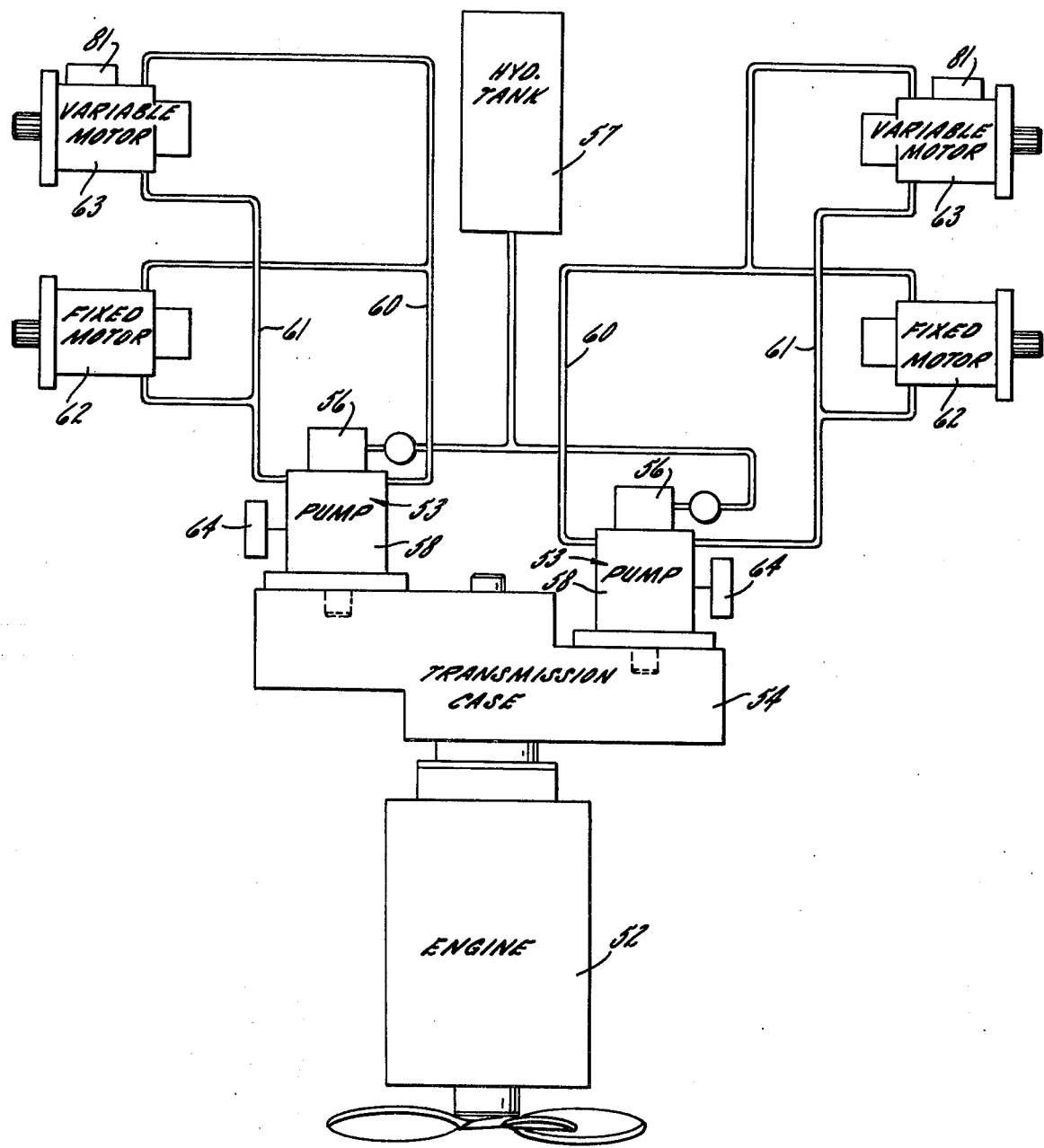
FIG. 9 is a schematic diagram of the hydraulic drive system.

As shown in FIG. 9, the pumps 53 each have a low pressure supply section 56 which draws hydraulic fluid as needed from a reservoir 57 and a variable displacement discharge section 58 coupled by detachable conduits 60 and 61 in closed parallel circuit with a pair of hydraulic motors 62 and 63 mounted on each of the traction assemblies 17. Each pump 53 is also provided with a control mechanism 64 whereby the pump displacement and supply/discharge direction through the conduits 60, 61 may be selectively regulated. By manipulation of the controls 64 the engine driven pumps 53 selectively supply hydraulic fluid in alternate forward and reverse directions to the hydraulic motors 62 and 63 mounted adjacent the rear end of each of the side frames 18.

Referring to FIG. 5, it will be seen that the motors 62, 63 are mounted with their drive gears 67, 68 on opposite sides of and in mesh with a gear 69 on a shaft 70, the opposite end of which carries an inboard brake drum 71 engageable by a brake shoe 72 upon actuation of a lever 73. The shaft 70 carries another gear 74 in mesh with a gear 75 on an intermediate shaft 76 which in turn carries a gear 77 in mesh with the final drive gear 78 secured to the drive sprocket 19 and journalled on a shaft 79 on which the sprocket 19 is also jounalled.

In further keeping with the invention, one of the drive motors 62 is a fixed displacement type and the other motor 63 is a variable displacement type having a regulating means 81 therefore. This combination permits a wide range of control over the combined speed and torque imparted by the motors 62 and 63 to the drive sprocket 19. For example, the motor 63 may be of an adjustable swash plate type having a null position at which the motor displacement is zero and having a range of under and over center positions which reverse the flow direction through the motor. When the swash plate is in the null position, all of the output of the pump 53 is directed to the fixed displacement motor 62. By moving the swash plate into the range of under center positions, the output of the pump 53 is split between the motors 62, 63 reducing the driving speed and increasing the torque imparted to the sprocket 19. Conversely, when the swash plate is moved into the range of over center positions, the motor 63 is effectively transformed into a booster pump drawing fluid from the discharge side of the fixed displacement motor 62 and increasing the pressure of the hydraulic fluid for re-admission into the input side of the motor 62. This, of course, progressively increases the speed of motor 62, but decreases the torque imparted to the sprocket because the variable displacement motor 63 is now being driven by the fixed displacement motor 62.

In accordance with another aspect of the invention the lower works 12 may be quickly disassembled to facilitate shipment on another form of carrier such as, for example, a truck bed or rail car. To this end, the crawler tracks 21 may be removed from each of the crawler assemblies 17, the side frames 18 are detachably connected to the transverse beams 16 and the beams 16 are, in turn, detachably connected to the front and rear of the central body portion 15 of the lower works 12.

As shown in FIGS. 4, 6 and 7, the central body portion 15 is in the form of a rigid box section having a pair of laterally spaced vertical flanges 91, 92 projecting longitudinally adjacent each corner. Each of the flanges 91, 92 have upwardly facing crescent-shaped hook openings 93 adjacent their upper ends and circular openings 94 adjacent their lower ends. A hydraulic cylinder 95 with a laterally extendable lock pin 96 is secured to the central body portion 15 in alignment with and in close proximity to the lower openings 94 in each pair of flanges 91, 92. The transverse beams 16 each have a pair of vertical webs 97 on their inner face spaced so that each web 97 fits between a pair of the flanges 91, 92. The webs 97 have circular openings 98 adjacent their lower ends for receiving the lock pins 96 and carry hook pins 99 at their upper ends receivable in the crescent-shaped hook openings 93. In the preferred embodiment, the transverse beams are provided with additional webs 101 which straddle each pair of flanges 91, 92 and which have openings 102 to receive the lock pins 96. Also, in their retracted position, the lock pins 96 are stored in sleeves 103 secured to the central body portion 15.

From the foregoing, it will be appreciated that the transverse beams 16 may be quickly demounted from the central body portion 15 by energizing the cylinders 95 with hydraulic fluid (for example from one of the pumps 53) to retract the lock pins 96 into the sleeves 103. The beams 16 may then be lifted withdrawing the hook pins 99 vertically out of the crescent-shaped openings 93.

In the illustrated embodiment the ends of each of the transverse beams 16 are of substantially rectangular cross-section and the side frames 18 are provided with complementary openings 105 to receive the ends of the beams in load bearing relation. The beams 16 are also provided with pairs of vertically spaced horizontal plates 106, 107 projecting longitudinally from the outer faces thereof. Each pair of plates 106, 107 has vertically aligned apertures 108, 109 therein and the side frames 18 each have a pair of inwardly projecting transverse mounting brackets 110 spaced to fit between respective pairs of the plates 106, 107 at the front and back of the central body portion 15. A mounting pin 111 is dimensioned to fit into the apertures 108, 109 and an opening 112 in the bracket 110. To facilitate insertion and withdrawal, each pin 111 is carried on a turnbuckle or ratchet jack assembly 113 selectively mounted on the beam 16 above either one of the apertures 108, 109. It will be understood that when the brackets 110 are pinned in the outboard apertures 109 the overall track width of the lower works 12 is greater (as shown in solid lines in FIG. 3) than when the brackets are pinned in the inboard apertures 108.

Because the crane 10 of the present invention is quite large, it must be disassembled for shipment and transport from one job site to another. In FIG. 4, the lower works 12 are shown after the upper works 13 and roller path 24 are removed. As shown in FIG. 7, the main components of the lower works 12 may also be quickly and conveniently disassembled. To this end, hydraulic jack means 115 are mounted on the beams 16 and hydraulic cylinders 116 are mounted within the beams and interconnect the beams 16 and the side frames 18.

To change the tread width of the track assemblies 17 or to remove the track assemblies from the lower works 13, the hydraulic jacks 115 are energized to take the load of the beams 16 off the side frames 18. The pins 111 can then be withdrawn by operating the turnbuckle or ratchet jack assemblies 112. Then by energizing the cylinders 116 the track assemblies can be moved laterally on the beams to a different position or pushed entirely off. Once the ends of the cylinders 116 are unpinned from the mounting brackets 117 on the side frames the track assemblies are free to be moved away to another location.

After the track assemblies are removed it is desirable to operate the jacks 115 sufficient to place the central car body 15 in contact with the ground or some supporting blocking material. The jacks can then be manipulated to just take the weight of the beams 16 off the car body 15 and the pins 96 can be withdrawn into their sleeves 103 by the cylinders 95. An auxiliary lift mechanism (not shown) may be utilized to prevent tilting of the beams, and lift eyes 116 are provided for this purpose. Further operation of the jacks 115 raises the beams 16 relative to the car body 15 and lifts the hook pins 99 out of the crescent-shaped hook openings 93. The detached beam 16 is then free to be moved away to another site.

It may also be seen upon reference to FIG. 7, that the maximum cross-sectional width of the transverse beams 16, side frames 18 (including their mounting brackets 110) and crawler tracks 21 are each less than the width of the central body portion 15. Thus, when the tracks 21, side frames 18 and transverse beams 16 are detached from one another and from the body portion 15, the detached components may be arranged for shipment on a carrier such as a truck bed, just wide enough to accommodate the central body portion 15. In this way the demounted lower works 12 may be conveniently shipped from one job site to another.

From the foregoing it will be appreciated that the present invention provides a demountable self-propelled transport assembly which as shown in FIG. 4 may be used as an independent heavy duty transport vehicle although normally it is intended to support the upper works 13 of a heavy duty crane 10 as shown in FIG. 1. The lower works 12 may also be quickly and conveniently disassembled as shown in FIG. 7 and as described above for shipment to another location. It will also be understood that the lower works may then be reassembled by substantially reversing the procedure discussed above.

We claim as our invention:

1. A demountable self-propelled transport assembly for a load handling vehicle comprising, in combination, a central body portion, a pair of transverse beams connected respectively to the front and rear of said body portion and extending laterally from the sides thereof, said connection between said body portion and each of said beams including at least one hydraulically actuated lock pin selectively connected to a hydraulic supply means for selective actuation thereby, a pair of side frames each coupled to the projecting ends of said beams in load bearing relation on opposite sides of said body portion, means for detachably connecting said frames to said beams, a crawler assembly mounted on each of said side frames, jack means mounted on said transverse beams for selectively relieving the load imposed on said side frames by said beams, lateral adjusting means interconnecting said beams and frames for shifting said frames relative to said beams, and means for selectively energizing said jacks and adjusting means to shift said side frames relative to said beams.

2. The combination defined in claim 1 wherein said detachable connecting means includes a plurality of pins with a turnbuckle assembly coupled to each of said pins.

3. The combination defined in claim 1 wherein each of said beams has a substantially box-shaped cross-section at its ends and said side frames are provided with complementary openings for receiving said box-shaped ends in load bearing relationship.

4. The combination defined in claim 1 wherein the connection between said body portion and each of said beams also includes a substantially vertically slotted hook element, a substantially horizontal pin and means are provided to selectively energize said jacks to unhook said beams from said body portion by moving said pin out of said slotted hook element.

5. The combination defined in claim 1 wherein the cross-sectional width of said transverse beams, side frames and crawler tracks are each less than the width of said body portion so that, when said tracks, frames and beams are detached from one another and from said body portion, the detached components may be arranged for shipment on a carrier just wide enough to accommodate said body portion.

6. A demountable self-propelled transport assembly for a load handling vehicle comprising, in combination, a central body portion, a pair of transverse beams connected respectively to the front and rear of said body portion and extending laterally from the sides thereof, a pair of side frames each coupled to the projecting ends of said beams in load bearing relation on opposite sides of said body portion, a crawler assembly mounted on each of said side frames, jack means mounted on said transverse beams for selectively relieving the load imposed on said side frames by said beams, lateral adjusting means interconnecting said beams and frames for shifting said frames relative to said beams, means for selectively energizing said jacks and adjusting means to shift said side frames relative to said beams, said connection between said body portion and each of said beams also including a substantially vertically slotted hook element, a substantially horizontal pin and means are provided to selectively energize said jacks to unhook said beams from said body portion by moving said pin out of said slotted hook element.

7. The combination defined in claim 6 wherein said means for selectively energizing said jacks and adjusting means includes pump means and control means, said pump means being driven by an internal combustion engine and said pump means, engine and control means being detachably mounted on said beam for removal therefrom as a unit.

* * * * *